(12) United States Patent
Asano et al.

(10) Patent No.: US 6,535,322 B2
(45) Date of Patent: Mar. 18, 2003

(54) ELECTROCHROMIC MIRROR

(75) Inventors: Tsuyoshi Asano, Yokohama (JP); Keizo Ikai, Yokohama (JP); Yoshinori Nishikitani, Yokohama (JP)

(73) Assignee: Nippon Mitsubishi Oil Corporation, Tokyo (JP)

( * ) Notice: Subject to any disclaimer, the term of this patent is extended or adjusted under 35 U.S.C. 154(b) by 0 days.

(21) Appl. No.: 09/749,016

(22) Filed: Dec. 27, 2000

(65) Prior Publication Data

US 2001/0008458 A1 Jul. 19, 2001

(30) Foreign Application Priority Data

Dec. 28, 1999 (JP) ............................................. 11-375078

(51) Int. Cl.$^7$ .............................. G02F 1/153; G02F 1/15
(52) U.S. Cl. ........................ 359/269; 359/265; 359/267; 359/273
(58) Field of Search ................................. 359/265, 266, 359/267, 270, 272, 273, 274, 275

(56) References Cited

U.S. PATENT DOCUMENTS

| | | | |
|---|---|---|---|
| 4,272,164 A | 6/1981 | Trussell, Jr. ................. 359/275 |
| 4,878,743 A | 11/1989 | Aikawa et al. ............. 359/271 |
| 5,187,607 A | 2/1993 | Endo et al. ................. 359/266 |
| 6,064,508 A | * 5/2000 | Forgette et al. ............ 359/267 |
| 6,166,848 A | * 12/2000 | Cammenga et al. ........ 359/267 |
| 6,178,034 B1 | * 1/2001 | Allemand et al. .......... 359/265 |
| 6,203,154 B1 | * 3/2001 | Kobayashi et al. ......... 359/270 |
| 6,285,486 B1 | * 9/2001 | Kobayashi et al. ......... 359/265 |

FOREIGN PATENT DOCUMENTS

EP          0 434 453 A2     12/1990

* cited by examiner

Primary Examiner—Georgia Epps
Assistant Examiner—Gary O'Neill
(74) Attorney, Agent, or Firm—Akin, Gump, Strauss, Hauer & Feld, L.L.P.

(57) ABSTRACT

An electrochromic mirror includes a transparent conductive substrate, a reflective conductive substrate, and an ion conductive layer disposed between the transparent conductive substrate and reflective conductive substrate. A highly conductive layer is provided on a conductive surface of at least one of the conductive substrates on a portion of the surface near its peripheral edge. The highly conductive layer has a smaller resistance than the surface resistance of the conductive surface upon which it is disposed.

13 Claims, 4 Drawing Sheets

ELECTROCHROMIC MIRROR

BACKGROUND OF THE INVENTION

1. Field of the Invention

This invention relates to electrochromic antiglare mirrors hereinafter referred to as EC mirror, which are useful as antiglare mirrors for an automobile.

2. Description of the Prior Art

Electrochromic mirrors have been used for glare-protection purposes from light emanating from the headlights of vehicles approaching from the rear by reversibly varying reflectance to electromagnetic radiation. Demand for such electrochromic mirrors has gone up sharply in recent years.

In general, an electrochromic mirror is formed by a transparent electrically conductive substrate and a reflective electrically conductive substrate between which an ion conductive layer is disposed. As disclosed in Japanese Patent Laid-Open Publication Nos. 9-120088 and 7-70218, there were reported considerably large number of EC mirrors having an ion conductive layer containing organic electrochromic materials such as viologen derivatives. However, these EC mirrors have a problem that coloration continued for a long time would cause the occurrence of remnant at the cathode side, i.e., would not clear immediately after the application of an electric voltage continued for a long time is terminated. Furthermore, an electrochromic mirror with a large size fails to color at its center portion especially at elevated temperatures. In the case of using a reflective electrode substrate having both a reflective layer and an electrode layer, such a reflective electrode substrate has a higher electric conductivity than those of conventional transparent substrates and thus can improve the response capability of the resulting electrochromic mirror. However, it has a malfunction that in the early stage of coloration the coloration of an electrochromic mirror including it biases from the side of a transparent conductive substrate where a lead wire is connected. Larger difference in surface resistance between the transparent conductive substrate and the reflective electrode substrate, this malfunction is more significant.

Therefore, an object of the present invention is to provide an electrochromic mirror which is free from remnant even after a long period of coloration and has an excellent response ability regardless of its size and also free from biased coloration in the early stage even using a reflective electrode substrate which is lower in surface resistance than a transparent conductive substrate.

After an extensive research and development, it was found that an EC mirror exhibiting the above-mentioned excellent performances can be obtained by arranging on the peripheral portions of the electrically conductive surface of at least one of the electrically conductive substrates a highly conductive layer having lower resistance than the surface resistance of the conductive surface.

SUMMARY OF THE INVENTION

According to the present invention, there is provided an electrochromic mirror comprising a transparent conductive substrate, a reflective conductive substrate, and an ion conductive layer disposed therebetween wherein at least one of the substrates is provided on the peripheral portions of its conductive surface with a highly conductive layer having a lower resistance than the surface resistance of the conductive surface.

The highly conductive layer is preferably provided at least on the peripheral portions and/or end surfaces of the conductive surface of one of the conductive substrates. The highly conductive layer is preferably provided at least on the peripheral portions of the conductive surface of the transparent conductive substrate. The highly conductive layer is preferably arranged in the form of lines on portions in the vicinity of the periphery of the conductive surface of the substrate. Furthermore, in an electrochromic mirror of the present invention, the pair of the conductive substrates are preferably joined at their peripheries with a sealant such that the highly conductive layer is free from the contact with the ion conductive layer with the aid of the sealant. Moreover, an electrochromic mirror of the present invention has an ion conductive layer containing an electrochromic compound.

DETAILED DESCRIPTION OF THE INVENTION

An electrochromic mirror is described in more detail below.

Two electrically conductive substrates are used in the electrochromic mirror according to the present invention. The term "electrically conductive substrates" used herein designates ones which act as electrodes. Therefore, the conductive substrate used in the present invention encompasses a substrate which itself is made from an electrically conductivity material, or a laminate formed by laminating, i.e. disposing an electrode layer on one or both of the surfaces of a non-electrically conductive substrate. Regardless of whether a substrate has electrically conductive or not, it necessarily has a smooth surface at normal temperature but may have a flat or curved surface and may be deformable under stress.

One of the two conductive substrates is transparent and the other is a reflective conductive substrate which can reflect electromagnetic waves, typically lights.

The transparent conductive substrate is usually produced by laminating a transparent electrode layer over a transparent substrate.

The term "transparent" used herein denotes an optical transmissivity of 10 to 100% in visible light region.

No particular limitations is imposed on the materials for such a transparent substrate. It may thus be a color or colorless glass, a reinforced glass and a resin of color or colorless transparency. Specific examples of such a resin include polyethylene terephthalate, polyamide, polysulfone, polyether sulfone, polyether etherketone, polyphenylene sulfide, polycarbonate, polyimide, polymethyl methacrylate and polystyrene.

Eligible materials for the transparent electrode layer may be a thin film of metal such as gold, silver, chrome, copper and tungsten or metal oxides such as ITO ($In_2O_3$—$SnO_2$), tin oxide, silver oxide, zinc oxide and vanadium oxide. The electrode layer has a film thickness in the range of usually 10 to 500 nm and preferably 50 to 300 nm. The surface resistance, i.e., resistance per unit area, of the electrode is usually in the range of 0.5 to 500 $\Omega$/sq and preferably 1 to 50 $\Omega$/sq. Any suitable known method for forming the electrode layer on the transparent substrate can be employed, depending on the type of material for the layer. In general, the electrode layer is formed by vacuum evaporation, ion plating, sputtering and a sol-gel method. The transparent conductive substrate has a light transmissivity of 50% or greater, preferably 70% or greater in visible rays regions.

The reflective electrically conductive substrate may be exemplified by (1) a laminate comprising a non-conductive transparent or opaque substrate and a reflective electrode layer formed thereon, (2) a laminate comprising a non-conductive transparent substrate having a transparent electrode layer on one of its surfaces and a reflective electrode layer on the other surface, (3) a laminate comprising a non-conductive transparent substrate having a reflective layer formed thereon and further a transparent electrode layer formed thereon, (4) a laminate comprising a reflective substrate and a transparent electrode layer formed thereon, and (5) a plate-like substrate which itself functions as a reflective layer and an electrode.

The term "reflective electrode layer" used herein denotes a thin film which has a specular surface and is stable electrochemically. Such a thin film are the films of metal such as gold, platinum, tungsten, tantalum, rhenium, osmium, iridium, silver, nickel, chromium, rhodium and palladium and the film of an alloy such as platinum-palladium, platinum-rhodium, silver-palladium, silver-palladium-copper and stainless steel. Any suitable method may be used for the formation of the thin film having a specular surface, and thus vacuum deposition, ion-plating or sputtering is suitably selected. A substrate for the reflective conductive layer may or may not be transparent. Therefore, the substrate may be the above-exemplified transparent substrates, and various opaque plastics, glasses, woods, and stones as well. In the case where the above-described reflective electrode layer itself has rigidity, a substrate therefor may be omitted.

The above-mentioned reflective plate and reflective layer are substrates and thin films both of which have a specular surface. The plate and layer may be a plate or a thin film, formed from silver, chrome, aluminum, stainless steel, and nickel-chrome.

The present invention is characterized in that the conductive substrate is provided on its peripheral portions of the conductive surface with a highly conductive layer having a smaller resistance than the surface resistance of the conductive surface.

Figure 1:
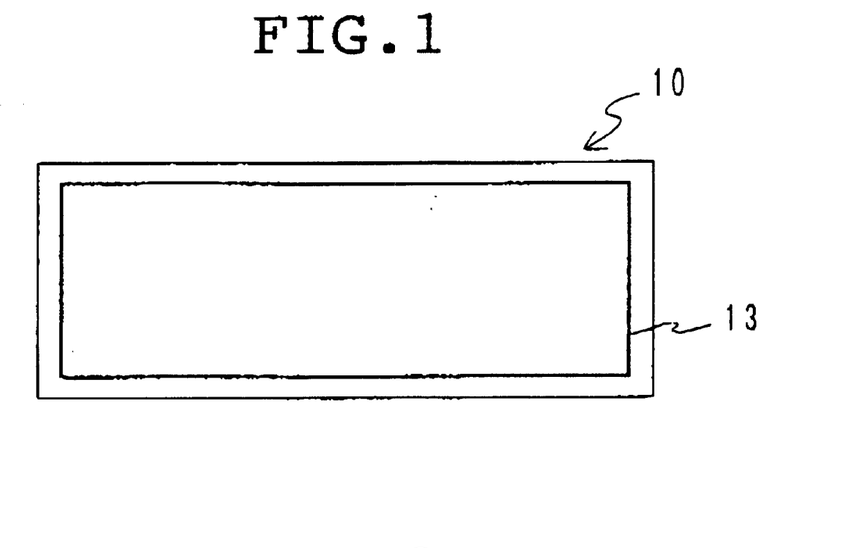
FIG. 1 is a front elevational view illustrating a pattern of an highly conductive layer arranged on the conductive surface of a substrate.
Figure 2:
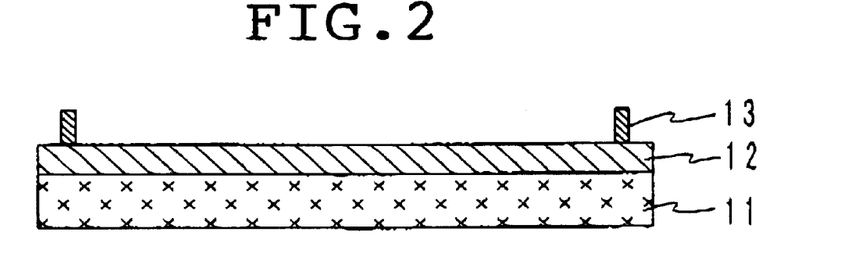
FIG. 2 is a cross-sectional view of the pattern shown in FIG. 1.
Figure 3:
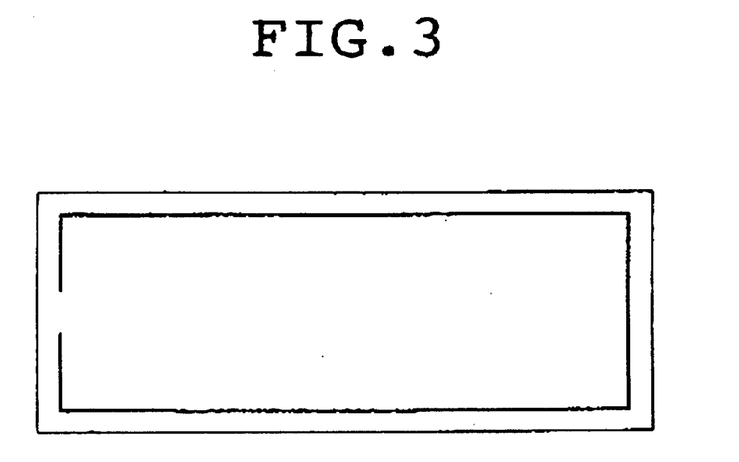
FIG. 3 is a front elevational view illustrating another pattern of an highly conductive layer arranged on the conductive surface of a substrate.
Figure 6:
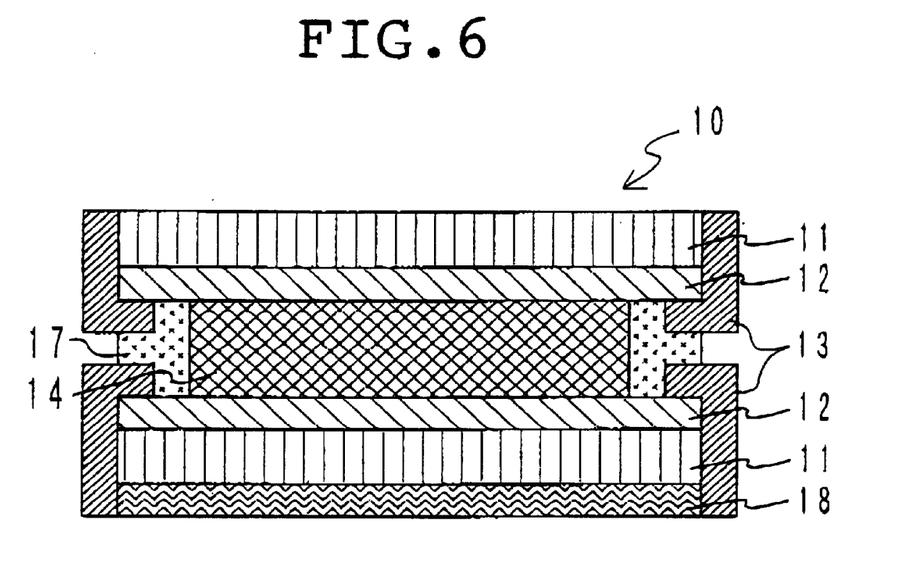
FIG. 6 is a cross-sectional view illustrating another example of a structure of an electrochromic mirror of the present invention.
Figure 7:
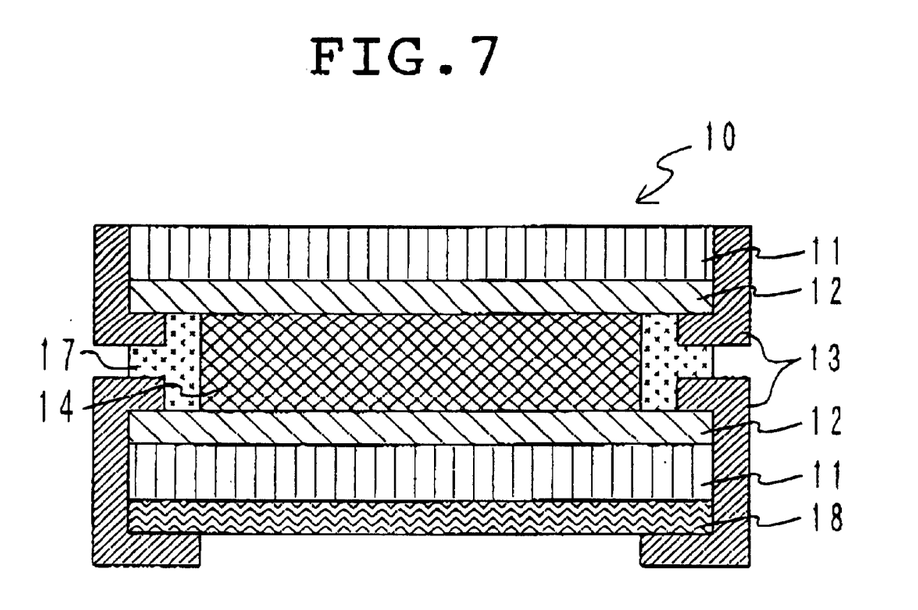
FIG. 7 is a cross-sectional view illustrating another example of a structure of an electrochromic mirror of the present invention.
Figure 8:
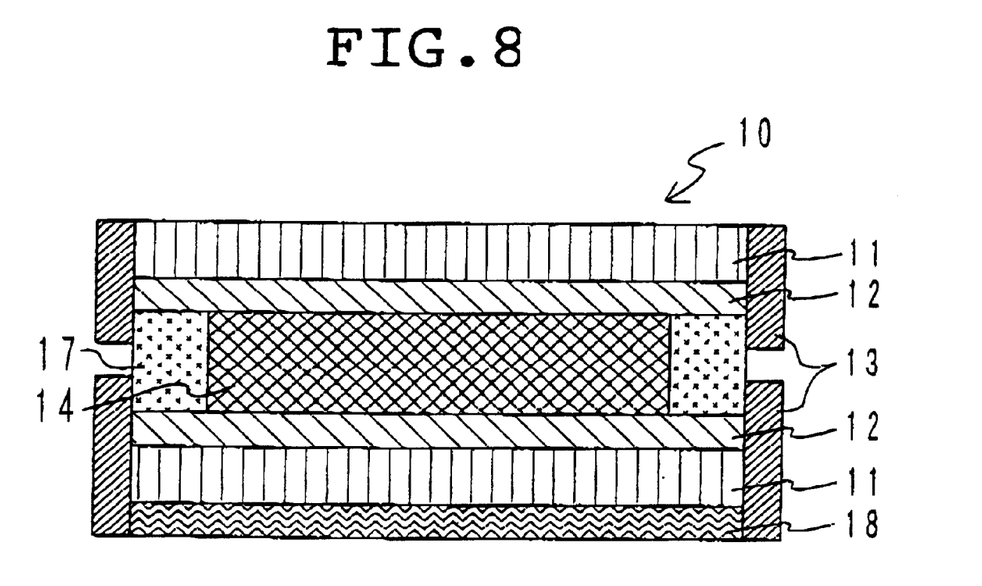
FIG. 8 is a cross-sectional view illustrating another example of a structure of an electrochromic mirror of the present invention.

Although not restricted, the highly conductive layer is arranged in the form of lines or belt in the vicinity of the peripheral edge of the conductive surface. Each of FIGS. 1 through 3 shows an example of the pattern of the highly conductive layer. In each example, the highly conductive layer 13 is disposed on a transparent electrode layer 12 formed on a transparent substrate 11. As shown in FIGS. 1 and 2, the highly conductive layer 13 may be formed over the whole peripheral portions of the transparent substrate 11 or may have a devoid portion. As shown in FIGS. 6, 7, and 8, the highly conductive layer 13 may be formed so as to extend turning around the end surfaces of the electrode layer or extend up to the non-conductive surface.

No particular limitation is imposed on materials for the highly conductive layer as long as they can provide a layer with a higher conductivity than the conductive substrate. Therefore, eligible materials are a conductive film of a metal such as gold, silver, chrome, copper, and tungsten or of conductive paste obtained by dispersing such a metal in resin. No particular limitation is imposed on the width, film thickness, surface resistance (Rsq) of the highly conductive layer as long as the surface resistance thereof is smaller than that of the conductive surface of the conductive substrate. The width of the highly conductive layer is usually from 0.05 to 10 mm, preferably from 0.1 to 20 mm, and more preferably from 0.5 to 2 mm. The film thickness is usually from 0.2 to 500 $\mu$m, preferably from 0.5 to 100 $\mu$m, and more preferably from 1 to 20 $\mu$m. The surface resistance is preferably ½ or less, more preferably ⅕ or less, and most preferably ¹⁄₁₀ or less of that of the conductive surface of the substrate. Therefore, the surface resistance is usually from 0.01 to 500 $\Omega$/sq, preferably from 0.01 to 50 $\Omega$/sq, and most preferably from 0.01 to 5 $\Omega$/sq.

The highly conductive layer is formed on the conductive surface of at least one of the conductive substrates. Alternatively, the layer may be formed on only one or both or the transparent- and reflective- conductive substrates. In the case where the surface resistances of the conductive substrates are significantly different from each other, the surface resistance of one of the substrates is usually 2 time or greater, preferably 5 time or greater, more preferably 10 times or greater and usually 200 time or less, preferably 100 times or less higher than that of the other substrate. In such a case, the highly conductive layer is preferably formed on the substrate with a higher surface resistance.

Although no particular limitation is imposed on the place where the highly conductive layer is formed, it is preferably formed on a position which is free from contact with the electrolyte and is preferably smooth to an extent that the formation of a cell is not hindered. The highly conductive layer may be formed not only on the conductive surface of a substrate but also additionally on the end surface of the same.

Although any suitable known methods may be employed for forming the highly conductive layer, it is preferably selected, depending on the materials of the layer. The highly conductive layer of a metal thin conductive film is usually formed by vacuum evaporating, ion plating, sputtering, and a sol-gel method. When the layer is formed from conductive paste having metal dispersed therein, screen-printing or dispensing may be employed.

Next, the ion conductive layer used in the present invention is described.

The ion conductive layer exhibits an ion conductivity at room temperature of $1 \times 10^{-7}$ S/cm or greater, preferably $1 \times 10^{-6}$ S/cm or greater, more preferably $1 \times 10^{-5}$ S/cm or greater. The ion conductive layer has a thickness of 1 $\mu$m or greater, preferably 10 $\mu$m or greater and 3 mm or less, preferably 1 mm or less.

Although not restricted, eligible materials for the ion conductive layer are various electrolytes which may be liquid, gelatinized and solid. Preferred are solid electrolytes, Eligible liquid electrolytes are ones dissolving a supporting electrolyte such as salts, acids, or alkalis in a solvent. No particular limitation is imposed on the solvent as long as it can dissolve the supporting electrolyte. Preferred are ones having a polarity. Specific examples of the solvent are water, and organic polar solvent such as acetic anhydride, methanol, ethanol, propylene carbonate, ethylene carbonate, dimethylsulfoxide, dimethoxyethane, acetonitrile, γ-butyrolactone, sulforan, 1,3-dioxane, N,N-dimethylformamide, 1,2-dimethoxyethane, and tetrahydrofuran. Preferred are propylene carbonate, ethylene carbonate, dimethylsulfoxide, dimethoxyethane, acetonitrile, γ-butyrolactone, sulforan, 1,3-dioxane, N,N-dimethylformamide, 1,2-dimethoxyethane, and tetrahydrofuran. These solvents may be used singlely or in combination.

No particular limitation is imposed on salts used as the supporting electrolyte, which may be inorganic ion salts such as alkali metal salts and alkaline earth metal salts, quaternary ammonium salts, and cyclic quaternary ammonium salts. Specific examples of such salts are alkali metal salts of lithium, sodium or potassium such as $LiClO_4$, $LiSCN$, $LiBF_4$, $LiAsF_6$, $LiCF_3SO_3$, $LiPF_6$, $LiI$, $NaI$, $NaSCN$, $NaClO_4$, $NaBF_4$, $NaAsF_6$, $KSCN$ and $KCl$; quaternary ammonium salts or cyclic quaternary ammonium salts such as $(CH_3)_4NBF_4$, $(C_2H_5)_4NBF_4$, $(n-C_4H_9)_4NBF_4$, $(C_2H_5)_4NBr$, $(C_2H_5)_4NClO_4$ and $(n-C_4H_9)_4NClO_4$, and mixtures thereof.

No particular limitation is imposed on acids as the supporting electrolyte. Any inorganic acids and organic acids may be used. Specific examples are sulfuric acid, hydrochloric acid, phosphoric acid, sulfonic acid, and carboxylic acid.

No particular limitation is imposed on alkalis as the supporting electrolyte as well. Sodium hydroxide, potassium hydroxide, and lithium hydroxide may be used.

Eligible gelatinized electrolytes are ones obtained by adding a polymer or a gelatinizer to the above-mentioned liquid electrolyte to be viscous or gelatinized. Although not restricted, the polymer may be polyacrylonitrile, carboxymethyl cellulose, polyvinyl chloride, polyethylene oxide, polyurethane, polyacrylate, polymethacrylate, polyamide, polyacrylicamide, cellulose, polyester, polypropylene oxide, and nafion. Eligible gelatinizers are oxyethylene methacrylate, oxyethylene acrylate, urethaneacrylate, acrylicamide and agar-agar. The gelatinized electrolyte may be sandwiched between two opposing conductive substrates by injecting a mixture of a monomer, which is a precursor of the polymer, and a precursor of the gelatinizer into a cell formed by laminating two conductive substrates and then polymerizing or gelatinizing the mixture.

No particular limitation is imposed on the solid electrolytes as long as they are solid at room temperature and have ion conductivity. Specific examples of the solid electrolyte are polyethylene oxide, a polymer of oxyethylenemethacrylate, nafion, polystyrene sulfonate. Particularly preferred are polymeric solid electrolyte obtained by polymerizing a precursor containing an oxyalkylene(metha)acrylate-based compound or a urethane acrylate-based compound as a main component. The solid electrolyte may be ones obtained by solidifying a precursor which is a compound containing a monofunctional acryloyl-modified polyalkylene oxide and/or a polyfunctional acryloyl-modified polyalkylene oxide, the above-mentioned organic solvent, and the above-mentioned supporting electrolyte.

The above-described ion conductive layer preferably contains an electrochromic compound. Known electrochromic compounds may be used in the present invention. No particular limitation is thus imposed on the electrochromic compound as long as it colors, decolors i.e. bleaches, and discolors by electrochemical oxidation or reduction reaction. Specific examples of the electrochromic compound are $Mo_2O_3$, $Ir_2O$, $NiO$, $V_2O_5$, $WO_3$, viologen, polytionphene, polyaniline, polypyrrole, metal phthalocyanine, pyrazoline, phenylenediamine, phenazine, phenoxazine, phenothiazine, tetrathiafulvalene, ferrocene, and derivatives thereof. These compounds may be used singlely or in combination. In this case, there may be used a cathode electrochromic compound and an anode electrochromic compound in combination. No particular limitation is imposed on the electrochromic compound concentration in an EC mirror However, the lower limit is usually 1 mM or more, preferably 5 mM or more, and more preferably 10 mM or more, while the upper limit is usually 200 mM or less, preferably 100 mM or less, and more preferably 50 mM or less.

An electrochromic mirror of the present invention may be produced by any suitable methods. For instance, when using liquid- or gelatinized liquid-type of ion conductive material, an electrochromic mirror can be produced by injecting an ion conductive material containing an electrochromic compound into a cell formed by arranging two electrically conductive substrates, spaced apart in an opposed relationship to each other with sealed peripheral edges, by vacuum injection or atmospheric injection or a meniscus method and then sealing the inlet.

Alternatively, depending on the ion conductive material to be used, a method may be employed in which the ion conductive layer is formed on one of the conductive substrates by sputtering, vacuum evaporation, and sol-gel method and the other substrate is laminated thereon or in which an ion conductive material containing an electrochromic compound is formed into a film beforehand and then sandwiched by two conductive substrates just like making a laminated glass.

When using a solid ion conductive material, particularly using a polymeric solid electrolyte containing urethaneacrylate or acryloyl- or methacryloyl-modified alkylene oxide, an EC mirror can be produced by injecting an unsolidified polymeric solid electrolyte into a cell formed by arranging two electrically conductive substrates, spaced apart in an opposed relationship to each other with sealed peripheral edges, by vacuum injection or atmospheric injection or a meniscus method and solidifying the electrolyte in a suitable manner after sealing the inlet.

Next, a cell into which the ion conductive material is injected is described. The cell is formed by laminating two conductive substrates placed to be opposed such that their conductive surfaces face each other, by applying a sealant on the peripheral edge.

In the case where the highly conductive layer is formed on the conductive surface of a conductive substrate, a sealant is applied on the highly conductive layer. The highly conductive layer is covered with a sealant such that it is free from the contact with the ion conductive layer, i.e., substantially separated therefrom thereby improving the durability.

A sealant used in the present invention may be epoxy-based sealants which have been widely used for the production of a liquid crystal display. The sealant may be ones of thermally cured type or photo-cured type.

Specific examples of such epoxy-based sealants are bisphenol A type epoxy resin, bisphenol F type epoxy resin, biphenyl type epoxy resin, bisphenol S type epoxy resin, diphenylether type epoxy resin, dicyplopentadiene type epoxy resin, bromine-containing bisphenol F type epoxy resin, fluorine-containing bisphenol A type epoxy resin, orthocresolnovolak type epoxy resin, DPP novolak type epoxy resin, trishydroxyphenylmethane type epoxy resin, tetraphenylolethane type epoxy resin, dicylopentadienephenol type epoxy resin, glycidylamine type epoxy resin, glycidyl ester type epoxy resin, alicyclic type epoxy resin, urethane-modified epoxy resin, and silicone-containing epoxy resin.

Specific examples of the thermally-curing sealant are ones cured only with an epoxy resin and ones cured with a curing agent to be added therein. Sealants of which the epoxy resin is cured is mixed with a catalytic curing agent. Specific examples of the catalytic curing agent are benzylsulfonium salt, benzylammonium salt, pyridinium salt, benzylphosphonium salt, hydrazinium salt, carboxylate, sulfonate, and amineimide. Specific examples of the curing agent to be mixed with a sealant are amine-based curing agents such as diethylenetriamine, triethylenetetramine, menthendiamine, isophoronediamine, methaxylenediamine, diaminodiphenylmethane, methaphenylenediamine, diaminodiphenylsulfone, and polyamideamine; acid anhydride curing agents such as methyltetrahydrophthalate anhydride, methylhexahydrophthalate anhydride, and methylnadic anhydride; and phenolic curing agents such as naphtol phenolic resin, dicyclopentadiene phenolic resin, and styrene phenolic resin. There may be used a latent thermally curing agent such as dicyandiamide, dihydrazide adipicate, imidazolic compounds, and an epoxy-amine adduct.

Specific examples of the photo-curing agent are the above-described epoxy resins, and epoxy-modified acrylic resins obtained by reacting the above-described epoxy resins with acrylic acid, methacrylic acid, crotonoic acid, hexylacrylic acid, or cinnamic acid. The photo-setting catalyst for the epoxy resins may be aryldiazonium salt, diaryliodinium salt, triarylsulfonium, β-ketosulfone, iminosulfonate, and benzoylsulfonate. The photo-setting catalyst for the epoxy-modified acrylic resins may be benzylmethylketal, α-hydroxyketone, and α-aminoketone.

The sealant may be mixed with beads. Beads act as spacers to keep the space, i.e., cell gap, between two conductive substrates, constant when they are laminated. The average particle size of such beads are usually from 200 to 20 $\mu$m, preferably from 150 to 30 $\mu$m, more preferably from 100 to 40 $\mu$m, and particularly preferably from 80 to 50 $\mu$m. No particular limitation is imposed on the materials for the beads as long as they have insulation properties. Therefore, there may be used (1) various glasses, such as quarts glass, soda-lime glass, borosilicate glass, and lead glass, or (2) various resins such as an acrylic-resin, a poly(propylene carbonate)-resin, a polycarbonate-resin, and a vinylbenzene-resin. The beads may be colorless or colored and may be transparent or opaque. In the case where the sealant is applied on the highly conductive layer, beads to be mixed with the sealant are preferably resinous ones such as an acrylic-resin.

When the sealant contains the beads, the content thereof is preferably from 0.01 to 10 percent by mass, more preferably from 0.05 to 5 percent by mass, and particularly preferably from 0.1 to 3 percent by mass. The sealant may contain fillers such as alumina and silica.

In the case where the beads are contained in the epoxy sealant, the viscosity thereof is preferably from 0.5 to 500 Pa.s, more preferably 2 to 300 Pa.s, and particularly preferably 5 to 150 Pa.s.

The sealant is usually applied on the prescribed place of the surface peripheral edge of either one of the conductive substrates or on the highly conductive layer if it is formed thereon. Needless to mention, the sealant may be applied on the surface peripheral edge of both the conductive substrates or on the highly conductive layer if it is formed thereon. In the case of using a substrate provided with a conductive layer, the sealant is applied on the surface peripheral edge of the conductive layer or on the highly conductive layer if it is formed thereon. The sealed portion may be provided with at least one opening through which the ion conductive material is injected.

In general, two conductive substrates have the same shape. In the case where two substrates are fittingly superposed on each other, the sealant is applied on the portion, 0.1 to 10 mm apart, from the edge of the substrate, along the shape thereof. Alternatively, in the case where two substrates are superposed on each other so as to be shifted in a parallel direction, the position of the sealant to be applied is adjusted depending on the direction or position to be shifted.

The sealant is applied by dispensing or screen-printing. It is practical that the sealant is applied such that the width thereof is on the order of 5 mm or less.

Thereafter, the two substrates are laminated by placing the substrate applied with the sealant so as to be opposed to the other substrate and then superposing them. The substrate provided with the highly conductive layer is disposed such that the conductive layer is opposed to the other substrate. The laminate of the two substrates is done by placing one of the substrate on the other substrate so as to take the same position and superposing them with a predetermined space or by placing one of the substrates on the other substrate to be displaced therefrom and superposing them with a predetermined space. This is selected depending on the type of an electrochromic mirror.

The lamination of the substrates is completed by curing the sealant. The sealant is cured under the conditions suitably selected depending on the types of substrates and sealants to be used. For example, the thermally curing sealant is heated at a temperature of usually 80to 200° C., preferably 100to 180° C. for one minute to 3 hours, preferably 10 minutes to 2 hours. When using the photo-curing sealant, eligible light sources are high voltage mercury lamps, fluorescent lamps and xenon lamps. Although not restricted, the irradiation dose is usually from 100 to 50,000 mJ/cm$^2$, preferably from 1,000 to 20,000 mJ/cm$^2$. Before one of the substrates is applied with the sealant and laminated on the other substrate, the sealant may be pre-cured by heating. The term "pre-cure" used herein denotes a state that the sealant is in the progress of curing, i.e., is not completely cured and fit to the substrate by being squashed when being superposed on the other substrate thereby exhibiting sufficient adhesivity. The cure of the sealant may be effected with the substrates pressed.

When laminating the substrates, they are arranged in a parallel relationship to one another. Although not restricted, the width of the cell gap is usually from 20 to 200 $\mu$m, preferably 30 to 150 $\mu$m. The width of the cell gap can be easily adjusted by selecting the particle size of the beads contained in the sealant. Alternatively, any suitable shaped spacer may be placed on the peripheral edge of the substrate in order to adjust the width of the cell gap.

An electrochromic mirror cell can be produced by following the above-described procedures. The cell is then connected to a power source mechanism thereby completing the production of an electrochromic mirror. Although not restricted, the power source may be connected to the conductive surface of the substrate or to the highly conductive layer formed on the substrate.

The basic structure of an electrochromic mirror of the present invention is described referring to the accompanying drawings.

Figure 4:
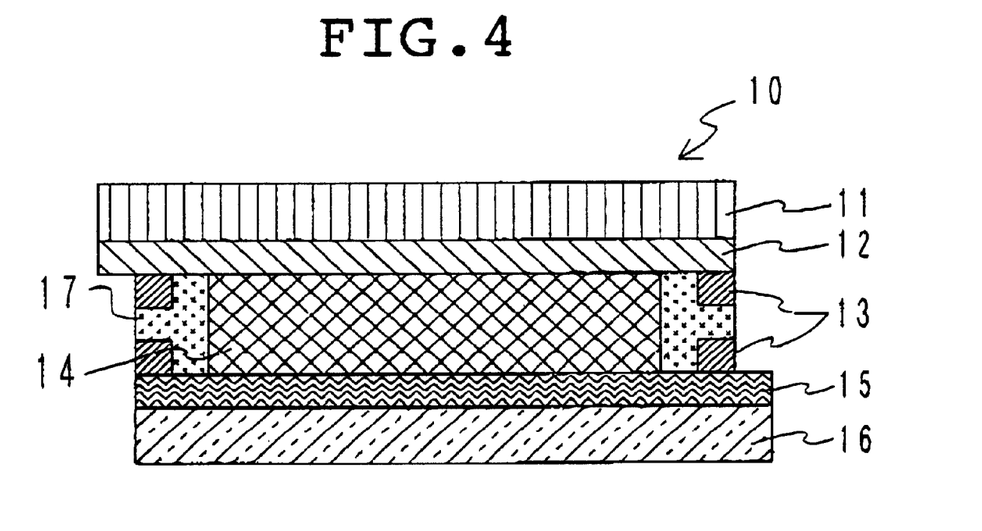
FIG. 4 is a cross-sectional view illustrating one example of a structure of an electrochromic mirror of the present invention.

An electrochromic mirror 10, shown in FIG. 4, has a transparent conductive substrate formed by a transparent substrate 11 and a transparent electrode layer 12 laminated thereon; a reflective conductive substrate formed by a transparent or opaque substrate 16 and a reflective electrode layer 15 laminated thereon; highly conductive layers 13 formed on the peripheral edge of each of the transparent electrode layer 12 and the reflective electrode layer 15; and an ion conductive layer 14 containing an electrochromic compound dispersed therein placed to be sandwiched between the two conductive substrates 11 and 16.

In the case where the reflective electrode layer 15 has a lower surface resistance than the transparent electrode layer 12, the highly conductive layers 13 may be omitted.

Figure 5:
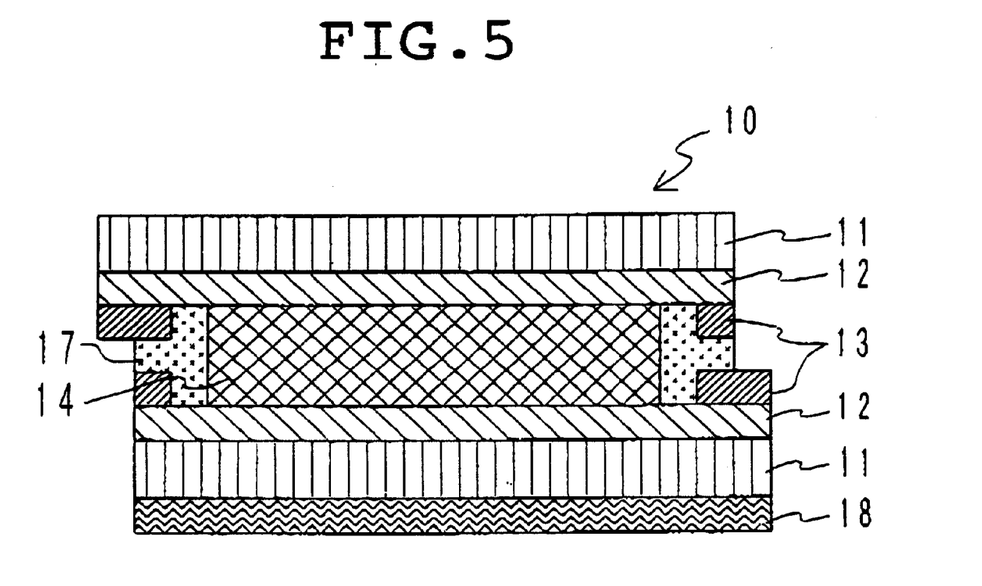
FIG. 5 is a cross-sectional view illustrating another example of a structure of an electrochromic mirror of the present invention.

An electrochromic mirror 10 shown in FIG. 5 has a transparent conductive substrate formed by a transparent substrate 11 and a transparent electrode layer 12 laminated thereon; a reflective conductive substrate 16 formed by a transparent substrate 11, a transparent electrode layer 12 laminated on its one surface and a reflective layer 18 laminated on the other surface; highly conductive layers 13 formed on the peripheral edge of each of the transparent electrode layers 12; and an ion conductive layer 14 containing an electrochromic compound dispersed therein placed to be sandwiched between the two conductive substrates 11 and 16.

Any suitable method can be employed for producing the electrochromic mirrors 10 shown in FIGS. 4 and 5. For example, after the transparent electrode 12 is formed on the transparent substrate 11, the highly conductive layer 13 is formed on the transparent electrode 12 thereby forming Laminate A. Separately, after the reflective electrode 15 is formed on the transparent or opaque substrate 16, the highly conductive layer 13 is formed on the reflective electrode thereby obtaining Laminate B. Laminates A and B are placed to be opposed to each other, followed by sealing the periphery of the opposed Laminates A and B except for a portion to be used an inlet thereby forming a cell with an inlet. The ion conductive material is injected into the cell through the inlet and cured if desired so as to form the ion conductive layer 14 thereby producing the electrochromic mirror 10 shown in FIG. 4.

A spacer may be used to maintain the space between Laminates A and B constant. No particular limitation is imposed on the spacer. There may be used bead or sheets made of (1) various glasses such as quarts glass, soda-lime glass, borosilicate glass, and lead-glass, or (2) various resins, such as an acrylic resin, a polycarbontae resin, and a vinyl benzene resin. The spacer may be sprayed over one of the conductive substrates, inserted between the conductive substrates in an opposing relationship, or provided by forming protrusions from insulating material on either one of the electrode. In the case where the spacer is sprayed over the sealant applied over the conductive substrate, the cell gap can be maintained constant even without mixing the based with the sealant.

Alternatively, Laminate A' is obtained by forming the transparent electrode 12, the highly conductive layer 13, the ion conductive layer 14 in this order on the transparent substrate 11. Separately, Laminate B' is obtained by forming the reflective electrode layer 15, and a highly conductive layer 13 in this order on the substrate 16. Thereafter, Laminates A and B are placed in an opposed relationship such that the ion conductive layer is brought into contact with the reflective electrode layer, followed by sealing the periphery of the opposed Laminates A and B with a sealant 17.

The present invention will be described by way of the following examples which are provided for illustrative purposes only.

EXAMPLE 1

There were prepared a transparent glass substrate coated with ITO of 10 Ω/sq; and a highly reflective conductive substrate obtained by forming a highly conductive layer on the periphery of the conductive surface of a laminate formed by a substrate and a palladium thin film layer of 2 Ω/sq deposited thereon. The highly conductive layer was formed into a pattern with 0.8 mm width and 10 μm thickness as shown in FIG. 1 on the periphery of the conductive surface of the substrate by screen-printing conductive paste containing gold. After being calcined at a temperature of 120° C. for one hour, the surface resistance of the highly conductive layer was 0.8 Ω/sq.

A cell with an inlet was produced by dispensing an epoxy-based sealant kneaded with glass beads having an average particle size of 120 μm in the form of line on the periphery of the palladium layer; spraying glass beads having an average particle size of 120 μm at a density of 3 pieces per cm² over the conductive surface; and superposing thereon the ITO-coated transparent glass substrate such that the ITO surface faces the palladium film surface, followed by curing the sealant while pressing the substrates. The cell gap of the cell thus obtained was about 125 μm.

Separately, a homogenous solution was obtained by adding to a mixed solution of 5.0 g of propylene carbonate and 0.03 g of 2-(5-methyl-2-hydroxyphenyl)benzotriazole manufactured by CIBA-GEIGY Co., Ltd. under the name of "TINUVIN P", tetrabutylammonium tetrafluoroborate, a cathodic electrochromic compound represented by the formula below, and anodic electrochromic compound represented by the formula below such that the concentration of these three compounds is made 0.5 M, 50 mM, and 30 mM.

(Cathodic electrochromic compound)

(PH: phenyl group)

(Anodic electrochromic compound)

The solution thus obtained was vacuum-injected into the cell obtained above. The inlet was sealed with an epoxy-based sealant thereby obtaining an electrochromic mirror as shown in FIG. 4.

The mirror when assembled was not colored and had a reflectivity of about 70%. The mirror was also quick in response to an application of an electric voltage and exhibited excellent electrochromic properties. Namely, the mirror was colored responding to a voltage of 1.3 applied thereto and had 7% reflectivity in 3 seconds. No biased coloration in the early stage was not observed. The mirror was decolored after applying the same voltage for 2 hours. However, remnant did not occurred. The coloration and decoloration were repeated every 10 seconds, no remnant occurred even after about 200 hours.

EXAMPLE 2

There were prepared a transparent glass substrate coated with ITO of 10 Ω/sq; and a substrate coated with the same ITO and having on the opposite surface of the ITO an aluminum reflective film with a protection film therefor and on the periphery of the conductive ITO layer a highly conductive layer. The highly conductive layer was formed into a pattern with 1.0 mm width and 10 μm thickness as shown in FIG. 3 on the periphery of the conductive surface of the substrate by screen-printing conductive paste containing silver. After being calcined at a temperature of 150° C. for 30 minutes, the surface resistance of the highly conductive layer was 0.5 Ω/sq.

A cell with an inlet was produced by dispensing an epoxy-based sealant kneaded with glass beads having an average particle size of 53 to 63 μm in the form of line on the periphery of the conductive surface of the reflective conductive substrate; spraying acrylic beads having an average particle size of 73 to 63 μm at a density of 4 pieces per $cm^2$ over the conductive surface; and superposing thereon the ITO-coated transparent glass substrate such that the ITO surfaces faces each other, followed by curing the sealant while pressing the substrates. The cell gap of the cell thus obtained was about 54 μm.

Separately, a homogeneous solution was obtained by adding tetrabutylammonium tetrafluoroborate and a compound represented by the formula given below to a mixed solution of 1.0 g of methoxypolyethylene glycol monomethacrylate (oxyethylene unit number: 4) manufactured by SHIN-NAKAMURA CHEMICAL CO., LTD. under the trade name of "M40GN", 0.02 g of polyethylene glycol dimethacrylate (oxyethylene unit number: 9) manufactured by SHIN-NAKAMURA CHEMICAL CO., LTD. under the trade name of "4G", 4.0 g of propylene carbonate, 0.02 g of 2,4,6-trimetylbenzoyl-diphenylphosphine oxide, and 0.03 g of 2-(5-methyl-2-hydroxyphenyl)benzotriazole manufactured by CIBA-GEIGY Co., Ltd., under the trade name of "TINUVIN P" such that the concentration of tetrabutylammonium tetrafluoroborate and the compound represented by the formula given below is made 0.5M and 100 mM, respectively.

The solution thus obtained was vacuum-injected into the cell obtained above. The inlet was sealed with an epoxy-based sealant. Thereafter, the sealant was cured by irradiating light of a fluorescent lump to the transparent substrate thereby obtaining an electrochromic mirror as shown in FIG. 5.

The mirror when assembled was not colored and had a reflectance of about 70%. The mirror was also quick in response to an application of an electric voltage and exhibited excellent electrochromic properties. Namely, the mirror was colored responding to a voltage of 1.3 applied thereto and had about 8% reflectance in 3 seconds. The mirror was decolored after applying the same voltage for 2 hours. However, remnant did not occurred. The coloration and decoloration were repeated every 10 seconds, no remnant occurred even after about 200 hours.

EXAMPLE 3

A highly conductive layer in the pattern as shown in FIG. 1 with 1 mm width and 25 μm thickness was formed on the periphery of the conductive surface over a transparent glass substrate coated with ITO of 60 Ω/sq by screen-printing conductive paste containing silver. After being calcined at a temperature of 150° C. for 1 hour, the surface resistance of the highly conductive layer was 0.05 Ω/sq. A reflective electrode substrate was prepared by forming on one side of a glass substrate an ITO film with a thickness of 10 nm and on the other side a silver-palladium film having a surface resistance of 0.7 Ω/sq.

A cell with an inlet was produced by dispensing an epoxy-based sealant in the form of line on the periphery of the conductive surface of the reflective conductive substrate; spraying acrylic beads having an average particle size of 73 to 63 μm at a density of 4 pieces per $cm^2$ over the conductive surface; and superposing thereon the ITO-coated transparent glass substrate such that the ITO surfaces faces each other, followed by curing the sealant while pressing the substrates. The cell gap of the cell thus obtained was about 54 μm. An electrochromic mirror was produced by following the procedures in Example 2 and using the electrochromic solution used therein.

The mirror when assembled was not colored and had a reflectivity of about 75%. The mirror was also quick in response to an application of an electric voltage and exhibited excellent electrochromic properties, Namely, the mirror was colored responding to a voltage of 1.3 applied thereto and had 7% reflectivity in 1.5 seconds. No biased coloration in the early stage was not observed. The mirror was decolored after applying the same voltage for 2 hours. However, remnant did not occurred. The coloration and decoloration were repeated every 10 seconds, no remnant occurred even after about 200 hours.

Comparative Example 1

An electrochromic mirror was produced by following the procedures of Example 2 except that the highly conductive substrate was omitted. The mirror was decolored after applying an electric voltage of 1.3 V for 2 hours. Remnant occurred on the cathodic side.

Comparative Example 2

An electrochromic mirror was produced by following the procedures of Example 3 except that the highly conductive substrate was omitted.

Biased coloration occurred from the side of the ITO substrate where a lead wire is connected after applying an electric voltage of 1.3 V to the mirror. The mirror was decolored after applying an electric voltage of 1.3 V for 2 hours. Remnant occurred on the cathodic side.

Comparative Example 3

Two transparent glass substrates were prepared each of which was coated with ITO of 10 Ω/sq. A film of tungsten oxide with about 500 nm thickness was formed over the ITO surface of one of the substrates by vacuum evaporation. An aluminum reflective layer and a protective layer therefor were formed over the opposite surface to the conductive surface of the other substrate.

A cell with an inlet was produced by dispensing an epoxy-based sealant kneaded with glass beads having an average particle size of 53 to 63 μm in the form of line on the periphery of the ITO surface of the reflective conductive substrate; and superposing thereon the ITO-coated substrate with the tungsten oxide layer such that the ITO surfaces of the reflective substrate faces the tungsten oxide layer, followed by curing the sealant while pressing the substrates. The cell gap of the cell thus obtained was about 54 μm.

Separately, a homogeneous solution was obtained by adding 2-(5-methyl-2-hydroxyphenyl)benzotriazole manufactured by CIBA-GEIGY under the trade name of TINUVIN P, lithium perchlorate and ferrocene to propylene carbonate such that their concentrations are made 30 mM, 0.1M, and 50 mM, respectively.

The solution thus obtained was vacuum-injected into the cell obtained above. The inlet was sealed with an epoxy-based sealant thereby obtaining an electrochromic mirror.

The mirror when assembled was not colored and had a reflectivity of about 68%. The mirror was colored responding to an electric voltage of 1.5 V thereto and had 12% reflectivity. The mirror was decolored after applying the same voltage for 2 hours. However, remnant did not occurred. The coloration and decoloration were repeated every 10 seconds, no remnant occurred even after about 200 hours.

As described above, the electrochromic mirror of the present invention is free from the occurrence of remnant spots even after long-period of coloration and biased coloration even when using a low resistance reflective electrode layer, and have excellent response and durability against repeated drive.

What is claimed is:

1. An electrochromic mirror comprising:
    (a) a transparent conductive substrate having a periphery and a first conductive surface;
    (b) a reflective conductive substrate having a periphery and a second conductive surface;
    (c) an ion conductive layer disposed between the transparent conductive substrate and the reflective conductive substrate;
        a highly conductive layer provided on at least one of a peripheral portion of the first and second conductive surfaces, the highly conductive layer having a surface resistance lower than a surface resistance of the conductive surface upon which it is disposed,
    wherein the transparent conductive substrate and the reflective conductive substrate are joined at their respective peripheries with a sealant containing 0.01 to 10 percent by mass of beads having an average particle size of 20 to 200 μm, such that the highly conductive layer is separated from the ion conductive layer.

2. The electrochromic mirror according to claim 1, wherein the transparent conductive substrate has at least one end surface, and the highly conductive layer is provided on the end surface of the transparent conductive substrate.

3. The electrochromic mirror according to claim 1, wherein the reflective conductive substrate has at least one end surface, and the highly conductive layer is provided on the end surface of the reflective conductive surface.

4. The electrochromic mirror according to claim 1, wherein the highly conductive layer is provided on the peripheral portion of the first conductive surface.

5. The electrochromic mirror according to claim 1, wherein the highly conductive layer is provided on at least one of the peripheral portion of the first conductive surface proximate its peripheral edge and the peripheral portion of the second conductive proximate its peripheral edge.

6. The electrochromic mirror according to claim 1, wherein the highly conductive layer is provided on the peripheral portion of the first conductive surface adjacent its peripheral edge.

7. The electrochromic mirror according to claim 1, wherein the highly conductive layer is provided on the peripheral portion of the second conductive surface adjacent its peripheral edge.

8. The electrochromic mirror according to claim 1, wherein the ion conductive layer contains an electrochromic compound.

9. The electrochromic mirror according to claim 1, wherein the surface resistance of the highly conductive layer is no more than one-half of the surface resistance of the conductive surface upon which it is disposed.

10. The electrochromic mirror according to claim 1, wherein the surface resistance of said highly conductive layer is no more than one-tenth of the surface resistance of the conductive surface upon which it is disposed.

11. The electrochromic mirror according to claim 1, wherein a surface resistance of the transparent conductive substrate is different from a surface resistance of the reflective conductive substrate, and the surface resistance of one of the conductive substrates is at least two times the surface resistance of the other conductive substrate.

12. The electrochromic mirror according to claim 11, wherein the highly conductive layer is formed on the substrate having the greater surface resistance.

13. The electrochromic mirror according to claim 1, wherein the highly conductive layer has a width of 0.1 mm to 20 mm.

* * * * *